Patented Aug. 12, 1941

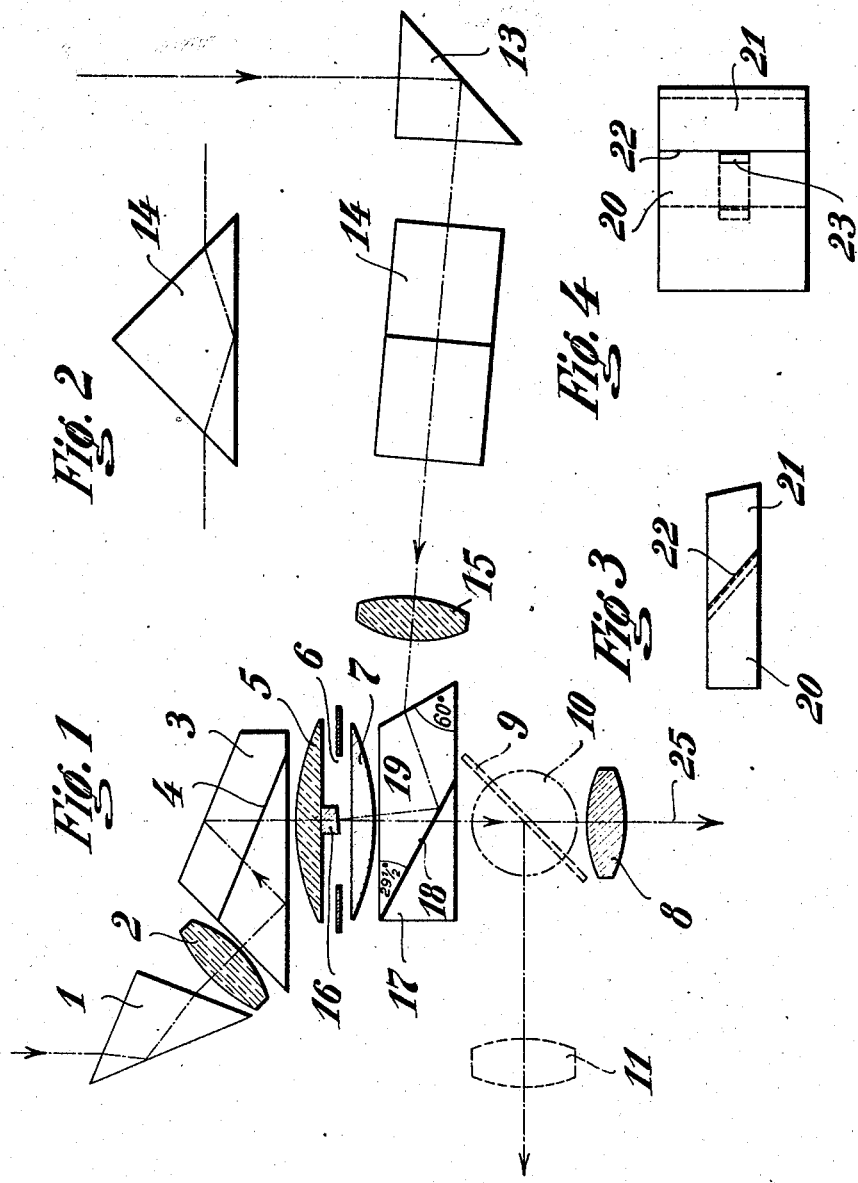

2,252,574

UNITED STATES PATENT OFFICE 2,252,574

PHOTOGRAPHIC DISTANCE METER

Ludwig Leitz, Wetzlar, Germany

Application May 22, 1940, Serial No. 336,511
In Germany August 7, 1939

1 Claim. (Cl. 88—2.6)

This invention relates to improvements in photographic distance meters which have an optical direct view image erecting telescope system with a reflecting mirror positioned in the optical axis of the system for combining the image made visible by reflection with the direct view image. The German Patent No. 622,390, dated November 27, 1935, discloses such a system. In such an arrangement said reflecting mirror is inclined to the optical axis at a relatively great angle so that the contours and surfaces of the two images which are formed in front of and behind the intermediate image forming plane do not show with sufficient sharpness and distinction. This may lead to errors in the focussing of the camera.

The object of this invention is to provide such a distance meter with an additional reflecting optical element so positioned in angular relation to the reflected light rays that the latter are totally reflected into the said first mentioned reflected mirror and at the same time the direct view light rays pass through the said additional reflecting element whereby to eliminate the aforementioned disadvantages.

In the accompanying drawing Fig. 1 is a diagram illustrating the invention. Fig. 2 is a detail view of a dove prism. Figs. 3 and 4 illustrate a modification.

In Fig. 1 the incoming direct view light rays pass into the system to form an image in the intermediate plane at 6. The rays pass through the dove prism 1, lens 2, prism 3 with roof edge 4, and lens 5. The image is observed through the ocular 8—7. The image is erect and true with respect to its sides. The reflected light rays pass through the prism 13, the dove prism 14 (see Fig. 2) and the lens 15 to the additional reflecting element. The latter consists of two prisms 17 and 19 spaced a slight distance apart to form a reflecting surface at 18 as will be understood. The said surface 18 reflects the second image into the reflecting mirror 16 in the optical axis 25. The reflection is total. The mirror 16 is relatively small and so positioned that it, after receiving the totally reflected rays from the surface 18, in turn reflects these rays back into and through the prism body 17—19 so that these reflected rays, coming from the elements 13, 14, 15 and 18, together with the direct incoming rays from the prism 3 pass into the eyes of the observer. It has been found that if the additional element be formed with angles such as are indicated in the drawing and with a refractive index of n 1.7174 the best results are obtained. In this case the reflected light rays are totally reflected over the entire surface 18. The direct rays pass freely through the element 17—19. A system thus arranged eliminates the disadvantages referred to above.

The additional reflecting element may be formed of two prisms 20 and 21 as shown in Figs. 3 and 4. The prisms are cemented together at 22. Behind the cemented surface the prism 20 is recessed as at 23 to provide a small air space to serve for total reflection behind the cemented surface. The angle of the cemented surface towards the optical axis must be so selected that the light rays coming from the lens 15 are totally reflected. After having been reflected by the element 16 the rays pass through the surface 22 together with the direct rays.

A swingable mirror 9 may be placed between the prisms 17—19 and the ocular lens 8 and mounted upon a rotatable support 10 to be adjusted so as to reflect the rays towards another ocular lens 11 whereby the system may also serve as an angular finder system.

I claim:

In a photographic distance meter for combining the direct incoming image forming rays with reflected image forming rays comprising an image erecting prism telescope system including a relatively small reflecting mirror in the optical axis of said system and positioned in the intermediary image forming plane thereof, an optical system positioned to one side of said optical axis for reflecting image forming rays into said telescope system, an additional prism element positioned in said optical axis and providing free passage of the direct incoming rays and having a totally reflecting surface for receiving said reflected image forming rays and reflect them into said mirror, the latter being positioned to receive said totally reflected rays and reflect them back towards and through said additional prism element, said reflected image forming rays and said direct rays passing through said prism element into the ocular of said system.

LUDWIG LEITZ.